March 6, 1934.  A. W. EMPSON  1,950,357
CENTRIFUGAL SEPARATOR
Original Filed Feb. 12, 1932
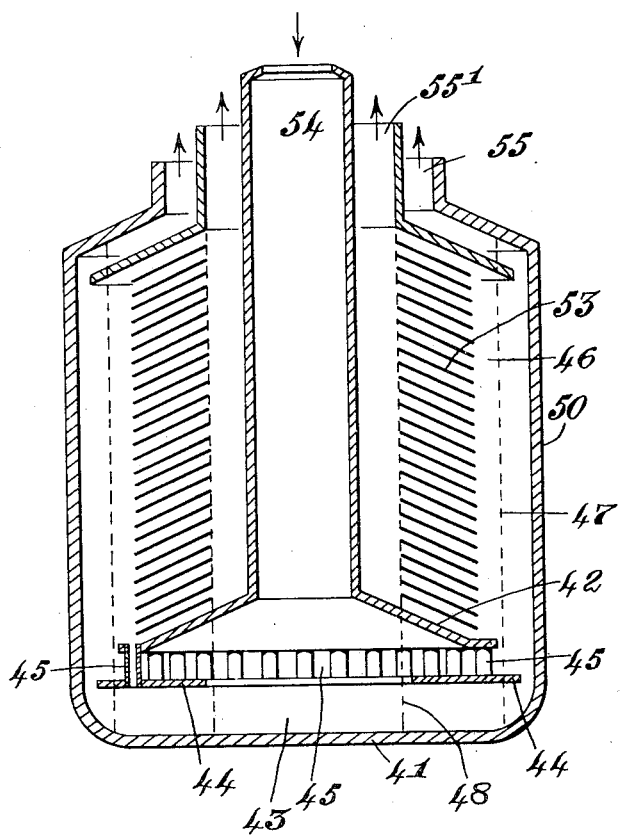

Patented Mar. 6, 1934

1,950,357

UNITED STATES PATENT OFFICE 1,950,357

CENTRIFUGAL SEPARATOR

Alfred Walker Empson, Gunnersbury, London, England, assignor to J. Stone & Company Limited, Deptford, England, a company of Great Britain Original application February 12, 1932, Serial No. 592,584. Divided and this application January 26, 1933, Serial No. 653,727. In Great Britain March 9, 1931

4 Claims. (Cl. 233—29)

This application is a division of my application Serial No. 592,584, filed February 12, 1932.

This invention relates to improvements in centrifugal separators. The specification of my patent application No. 592,584, filed 12th February 1932, describes a process for the separation of impurities, including colloidal and other suspended matter, from oils, for example the reconditioning of used lubricating and insulating oils. This process involves the addition to the contaminated oil of a small quantity of water which is very intimately mixed with the oil in such manner as to secure its fine dispersion in the latter, thereby causing coagulation of the suspended colloidal carbon and other impurities into clots or tangible masses which, with the added water, can be readily separated from the oil in, for example, a centrifugal separator.

Although centrifugal separators of conventional types can be used or readily adapted for the purposes of that process, it is one object of the invention to provide a separator devised more especially to meet the requirements thereof. The output capacity of a centrifugal separator is considerably reduced when it is required to deal with mixtures or emulsions of oil and water in addition to impurities. Increased input results in the delivery of an imperfectly separated or dehydrated oil from the oil spout, and of emulsion or mixed oil and water from the water spout. This imperfect separation is apparent, even when the oil and water entering the drum are not emulsified and, in fact, are in such an unstable state that they are capable of separating in a short time under the action of gravity alone.

It has been found that the imperfect result aforesaid is due to the re-mixing of oil and water taking place at or near what should be the line of demarcation between oil and water in the centrifugal drum. The result is that the restricted space between the outer edges of the separator cones and the water line is called upon to deal with the relatively large percentage of water.

It is one object of the present invention to provide means for overcoming this difficulty. With this object in view, provision is made in the separator of a preliminary separating space located adjacent the inlet duct and bounded by the lowermost cone of the main separating space and a baffle spaced from the bottom of the separator. This preliminary separating space is provided with separate means of communication with the zones for the lighter and heavier components in the main separating space. In the said preliminary separating space, for example, easily separable water and dirt or impurities may leave the incoming mixture and flow direct to the water zone surrounding the cones, whilst the oil freed from the bulk of its contained water can flow separately to the oil space in and immediately around the cones without remixing with the water.

Whilst of particular advantage when employed in the process of our above mentioned specification, the separator according to the present invention is readily applicable to other purposes and separation processes wherein a preliminary separation or avoidance of remixture, emulsification or the like is of advantage.

One form of separator in accordance with the invention will now be more fully described by way of example and with reference to the accompanying drawing which shows the separator in vertical section. For the purpose of describing the action of the separator, it will be assumed that a mixture of water and oil is being separated. As illustrated in the drawing, additional space is provided in the separator at the bottom of an axial inflow 54 by making the bottom 41 of the drum 50 flat and spaced from the bottom cone 42 instead of conical, parallel and adjacent to the cones. In the additional bottom space 43 thus created, an annular baffle plate 44 is supported with its outer circular edge extended just beyond the water line 47 and its inner circular edge just outside of the oil line 48 of the main separating space. The peripheral portion of the lowermost cone 42 is preferably horizontally extended in like manner to constitute an upper baffle. Tubes 45 are fixed between the peripheral parts of the baffles 44, 42 thereby opening communication between the space beneath the lower baffle and the space above the upper baffle. Thus, mixed oil and water entering the axial inlet 54 descends towards the bottom of the drum and passes into the preliminary separating space between the cone 42 and baffle 44. The easily separated water content of this mixture is at once induced to flow between the tubes 45 direct to the water space surrounding the revolving cones 53 of the main separating space, leaving easily separated oil trapped within the water line, but free, under the induced pressure, to pass over the inner edge of the lower baffle 44 into the space beneath it. From such space, this oil has direct access to the space between the lowermost cones of the main separating space, by way of the tubes 45 hereinbefore described. The space 46 immediately surrounding the peripheries of the cones, is thus only called upon to carry and distribute that portion of the water which is more or less emulsified with oil and which, in the majority of cases, is a very small percentage. After normal separation in the main separating space, the water leaves by way of the outlet 55 and the oil by way of the outlet 55¹.

In this form of separator there is avoidance of the useless creation of fresh emulsion in the machine itself. This is due to the fact that, by the means provided, a preliminary coarse separation takes place with guidance of the constituents so separated directly into their appropriate paths.

I claim:

1. Centrifugal separator comprising inlet and outlet ducts, a main separating space provided with the usual cones, an annular baffle spaced from the bottom and the cylindrical wall of the separator, said baffle and the lowermost cone of the main separating space together forming a preliminary separating space communicating with the inlet duct, and a series of spaced ducts mounted between said baffle and said lowermost cone and adapted to establish communication between the space below the baffle and the zone for the lighter component in the main separating space, the aforesaid preliminary separating space being thereby in communication with the zone for the heavier component in the main separating space by way of the intervals between the spaced ducts and with the zone for the lighter component in the main separating space by way of the space below the baffle and the channels in the ducts.

2. Centrifugal separator comprising, a casing having side walls and a bottom, means forming a main separating chamber in the casing provided with conical elements, a baffle disposed below the main separating chamber and extending peripherally into proximity with the inner limit of the zone for the heavier component in said chamber, a second baffle disposed between the first baffle and the bottom of the separator casing, and a series of ducts establishing communication between the space below the second baffle and the main separating chamber at a location adjacent to the outer periphery of the conical elements.

3. Centrifugal separator comprising, a casing having side walls and a bottom, means forming a main separating chamber provided with conical elements, a baffle disposed below the main separating chamber and extending peripherally into proximity with the inner limit of the zone for the heavier component in said chamber, a second baffle disposed between the first baffle and the bottom of the separator casing and extending peripherally beyond the inner limit of the zone for the heavier component in the main separating chamber, and a series of ducts establishing communication between the space below the second baffle and the main separating chamber at a location adjacent to the outer periphery of the conical elements.

4. Centrifugal separator comprising, a casing having side walls, a bottom and inlet and outlet ducts, means forming a main separating space provided with cones, means forming a preliminary separating space communicating with the inlet duct and located between the lowermost cone and the bottom of the separator, means of communication between said preliminary separating space and a zone outside the outer periphery of the cones in the main separating space, and separate means of communication between said preliminary separating space and a zone within the aforesaid zone and adjacent to the outer periphery of the cones in the main separating space, whereby heavier and lighter components can flow by separate paths from said preliminary separating space to their respective zones in the main space.

ALFRED WALKER EMPSON.